Aug. 25, 1970 W. A. BOYCE 3,525,898
BASING CEMENT FOR ELECTRIC LAMPS AND SIMILAR DEVICES, AND
STRESS-RELIEVING BASE STRUCTURE UTILIZING SUCH CEMENT
Filed Nov. 18, 1968

WITNESSES
Helen M. Farkas
James T. Young

INVENTOR
Walter A. Boyce
BY
D. S. Buler
AGENT

3,525,898
BASING CEMENT FOR ELECTRIC LAMPS AND SIMILAR DEVICES, AND STRESS-RELIEVING BASE STRUCTURE UTILIZING SUCH CEMENT

Walter A. Boyce, Glen Ridge, N.J., assignor to Westinghouse Electric Corporation, Pittsburgh, Pa., a corporation of Pennsylvania
Filed Nov. 18, 1968, Ser. No. 776,680
Int. Cl. H01j 5/48, 5/50
U.S. Cl. 313—318                    10 Claims

ABSTRACT OF THE DISCLOSURE

An improved cement for attaching plastic base members to the sealed end portions of the glass envelopes for fluorescent lamps and similar devices. The cement contains marble flour and a polyvinyl acetate homopolymer emulsion, and preferably includes wood rosin and denatured alcohol. In contrast to conventional shellac-containing cements, the improved cement does not polymerize at the operating base temperatures encountered in high-output type fluorescent lamps and thus remains thermoplastic. Cracking of the stress-sensitive glass seals enclosed by the cemented bases is thus prevented.

BACKGROUND OF THE INVENTION

Field of the invention

This invention relates to the art of attaching a base or connector to an electrical device and has particular reference to an improved basing cement for electric lamps and to a base structure made with such cement.

Description of the prior art

As is well known, the bases of fluorescent and incandescent lamps are attached to the sealed ends of the glass envelopes by means of a suitable cement which joins the members together when the cement is heated and cured during the basing operation. An essential constituent of the prior art cements was shellac which served as a binder and converted the cement into a hardened mass during the curing process. While these shellac-containing basing cements satisfactorily secured the base to the end of the envelope, the introduction of high-output type fluorescent lamps having all-plastic base members revealed that such cements had a serious deficiency. It was found that at the higher operating temperatures developed by such high-output lamps the cement polymerized and was thus converted from a thermoplastic to a thermosetting material. Due to the rigiidty of the plastic base members, the cement produced strains in the glass as the latter expanded and contracted due to temperature variations encountered during lamp use and frequently cracked the stress-sensitive glass seals which, of course, ruined the lamp.

In certain types of prior art cements a thermosetting additive is purposely included. However, such cements are used with bases having shells made of sheet metal that is thin enough to "give" and thus relieve the forces that would otherwise stress the glass seals.

SUMMARY OF THE INVENTION

It is accordingly the general object of the present invention to provide an improved and novel basing cement that will securely fasten a base or the like to a glass envelope without impairing the quality of the finished device or shortening its useful life.

A more specific object is the provision of a basing cement for highly-loaded fluorescent lamps and other lamps having operating temperatures of the same order of magnitude, which cement, when cured, will effect a strong juncture between a rigid base member and the sealed end of the glass envelope without stressing or otherwise deleteriously affecting the enclosed sealed portion of the envelope when the lamp is operated and in use.

Another object is the provision of a base structure for an electric lamp or similar device which will inherently relieve stresses produced by changes in temperature and thus protect the envelope from being damaged.

The foregoing objects and other advantages are achieved in accordance with the present invention by providing a basing cement in which polyvinyl acetate homopolymer is used as the binding agent or material rather than the shellac and optional thermosetting additives employed heretofore. The polyvinyl acetate component is included in the cement formulation as an aqueous emulsion. The cement includes suitable amounts of marble flour and, desirably, wood rosin and denatured alcohol. It has the same consistency, working properties, etc. as the prior art shellac-containing cements but does not polymerize at the elevated operating temperatures encountered in high-output type fluorescent lamps and thus overcomes the cracked seal problem.

BRIEF DESCRIPTION OF THE DRAWING

A better understanding of the invention will be obtained by referring to the accompanying drawing, wherein.

PREFERRED EMBODIMENT

Figure 1:
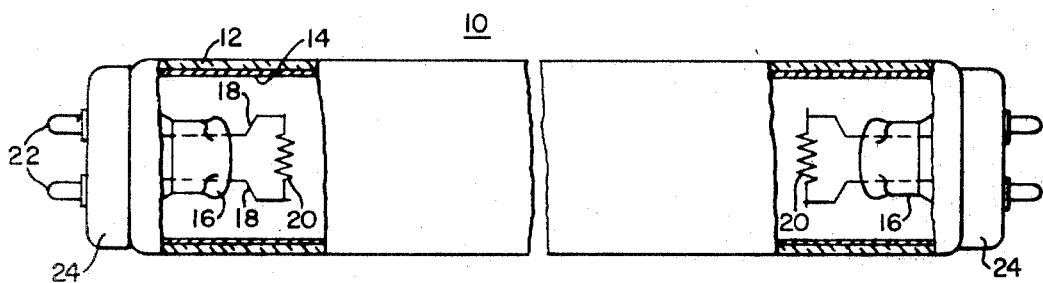
FIG. 1 is a front elevational view of a fluorescent lamp having rigid plastic base members that are attached to the envelope by the improved cement of the present invention.

With specific reference to the drawing, in FIG. 1 there is shown a fluorescent lamp of conventional construction having a tubular glass envelope 10 with a layer 14 of suitable phosphor such as a halophosphate phosphor on its inner surface. Each end of the envelope 12 is sealed to a glass stem 16 which has a pair of lead wires 18 that are sealed through its inner end and connected to a cathode 20 in the usual manner. The lamp is dosed with a predetermined amount of mercury and a fill gas, such as argon or a mixture of argon or neon, so that a low-pressure electrical discharge is sustained between the cathode 20 when the lamp is energized. The outer ends of the lead wires 18 are connected to contact pins 22 that are anchored in and extend outwardly from hollow base members 24 that are molded from a suitable thermosetting type plastic and are attached to the respective ends of the envelope 12.

Figure 2:
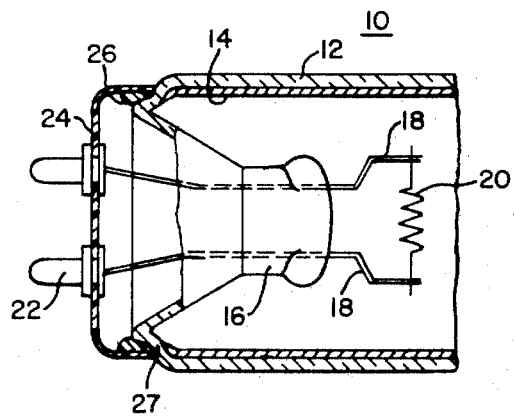
FIG. 2 is an enlarged cross-sectional view of one end of the aforesaid lamp showing the manner in which a ring of the improved cement joins the base member to the sealed end of the lamp envelope.

As will be noted in the cross-sectional view of the end of the lamp 10 shown in FIG. 2, the collar of the plastic base member 24 is fastened by a ring of cured basing cement 26 to the annular seal 27 formed by the fused juncture of the end of the envelope 12 and the flared end of the glass stem 16.

In accordance with the invention, the basing cement 26 as prepared comprises an admixture of marble flour and a polyvinyl acetate homopolymer emulsion consisting of water suspension that has a solids content of from 55 to 57% by weight. An emulsion of this type is marketed under the trade name "Vinac WR50" by the Airco Chemical Company, New York, N.Y. Marble flour is an inert filler material which, when combined with the emulsion, forms a paste of the proper consistency. As a specific example of a suitable formulation, approximately 20 grams of the polyvinyl acetate emulsion is mixed with about 35 grams (approximately 64% by weight) of marble flour. This provides a cement of paste-like consistency that can be readily deposited within the base member and cures in about 1 minute at a temperature of approximately 160° C. to form a strong juncture between the base member and the envelope. It will be understood that the relative amounts of marble flour and emulsion are not critical and can be varied within a wide range by those skilled in the art to provide cements of various consistencies and holding power. For example, marble flour can comprise from 55 to 70% by weight of the admixture.

It has been found that stronger bonds can be achieved by adding wood rosin and denatured alcohol to the formulation. Apparently the wood rosin serves as sort of a "flux" which enables the cement to "wet" and more tenaciously grip the adjacent bulb and base surfaces. The denatured alcohol serves as a solvent for the wood rosin. While various amounts of these additives may be used, a cement formulation which has given excellent results is set forth in Table I below.

TABLE I

| Constituent | Grams | Percent by wt. |
| --- | --- | --- |
| Marble flour | 35 | 69.8 |
| Wood rosin | 4 | 8.0 |
| Denatured alcohol | [1] 3.12 | 6.2 |
| Polyvinyl acetate homopolymer emulsion | 8 | 16.0 |

[1] 4 cc.

The emulsion used in the above formulation consisted of an aqueous suspension of from about 55 to 57% by weight (solids) of the polyvinyl acetate in water (that is, the "Vinac WR50" material mentioned above). This cement formulaltion has the same consistency, approximately the same pot life and has the same curing temperature and time as the prior art shellac-containing cements employed to base fluorescent lamps. It cures at a temperature of approximately 160° C. in about 1½ minutes. Experimental tests have shown that it is fed properly into the bases by the automatic base pre-filling machines and, when cured, securely fastens the base to the end of the lamp envelope and has sufficient strength to withstand a torque of 5 foot-pounds. The cured cement does not polymerize at the operating temperatures developed by high output fluorescent lamps (approximately 80° C.) and thus remains thermoplastic and resilient enough to accommodate the expansion and contraction of the enclosed sealed portion of the envelope when the lamp is operated and then deenergized. Comparatives tests have shown that lamps based within plastic bases and the improved cement withstood a temperature of 110° C. for one week without developing any cracked seals whereas lamps employing conventional shellac-type cement invariably developed this defect under the same conditions. A fluorescent lamp 10 having a base structure utilizing the cement formulation set forth in Table I is shown in FIG. 1. As illustrated in detail in FIG. 2, the cement 26 is preferably deposited in the form of a ring within the collar portion of a conventional rigid hollow base member 24 composed of thermosetting plastic and thus encloses the annular seal 27 formed by the fused juncture of the end of the tubular glass envelope 12 with the flared rim of the glass stem 16. The cement 26, when cured, thus securely joins the sealed end of the envelope 12 to the overlying adjacent portion of the rigid plastic base 24.

The relative amounts of the constituents are not critical and can be varied over a rather wide range, depending upon the consistency desired for the uncured cement, the shear strength requirements for the cured cement, etc. Optimum results however, have been obtained by utilizing the materals in the amounts shown in Table II below.

TABLE II

| Constituent: | Range in percent by weight |
| --- | --- |
| Marble flour | 60–80 |
| Wood rosin | 6–12 |
| Denatured alcohol | 4–8 |
| PVA emulsion | 10–20 |

Preferably, the wood rosin and alcohol are used in the ratio of approximately 1:1 on a weight percent basis to insure that all of the rosin is dissolved and is evenly distributed throughout the cement during the mixing operation.

It is important to note that polyvinyl acetate homopolymer must be used in order to provide suitable water resistance of the cured cement. Hence, polyvinyl acetate copolymer or other forms of polyvinyl acetate resin are not suitable since they do not provide the required degree of water resistance in the cured cement.

It will be appreciated from the foregoing that the objects of the invention have been achieved in that a very simple and effective solution to the cracked seal problem in certain types of fluorescent lamps has been provided. Comparative studies have shown that the material costs for the improved cement and the prior art shellac-containing cements are approximately the same.

While several specific examples and a preferred lamp embodiment have been illustrated and described, it will be appreciated that various changes can be made in the composition of the cement and that the cement can be used in other types of devices without departing from the spirit and scope of the invention. For example, the improved cement is not limited to high-output type fluorescent lamps having plastic bases but can also be used to base low wattage incandescent lamps that operate within the same temperature range and have rigid metal or plastic shells.

I claim as my invention:

1. A basing cement for electric lamps and similar devices comprising an admixture of marble flour and a polyvinyl acetate homopolymer emulsion.

2. The basing cement of claim 1 wherein said emulsion comprises a suspension of polyvinyl acetate homopolymer in water.

3. The basing cement of claim 2 wherein said aqueous emulsion contains from about 55% to 57% by weight of homopolymer polyvinyl acetate.

4. The basing cement of claim 3 wherein marble flour comprises from about 55% to 70% by weight of the admixture.

5. The basing cement of claim 3 wherein said admixture contains approximately 64% by weight of marble flour.

6. The basing cement of claim 3 wherein wood rosin and alcohol are included as constituents and the cement has the following composition:

| Constituent: | Percent by weight |
| --- | --- |
| Marble flour | 60–80 |
| Wood rosin | 6–12 |
| Denatured alcohol | 4–8 |
| Polyvinyl acetate homopolymer emulsion | 10–20 |

7. The basing cement of claim 6 wherein:
marble flour comprises about 70% by weight of the composition,
polyvinyl acetate homopolymer emulsion comprises from 10% to 20% by weight of the composition, and
the remainder comprises a mixture of wood rosin and denatured alcohol in the ratio of 1:1 on a percent by weight basis.

8. The basing cement of claim 6 having the following composition:
approximately 70% by weight marble flour,
approximately 8% by weight wood rosin,
approximately 8% by weight denatured alcohol, and the remainder polyvinyl acetate homopolymer emulsion.

9. In an electric lamp or similar device that has a vitreous envelope, the combination of:
a hollow base member of rigid material disposed in enclosing relationship with an end of said envelope, and
a quantity of cured thermoplastic basing cement joining said base member and envelope and consisting essentially of admixed marble flour and polyvinyl acetate homopolymer.

10. The combination of claim 9 wherein:
said base member is composed of thermosetting plastic, and
said cement extends around the periphery of said envelope and the adjacent overlying portion of said base member.

References Cited

UNITED STATES PATENTS

| | | | |
|---|---|---|---|
| 1,900,536 | 3/1933 | Zola | 161—202 X |
| 1,908,004 | 5/1933 | Zola | 161—202 X |
| 2,653,090 | 9/1953 | Crandall | 92—3 |
| 2,727,843 | 12/1955 | Tillyer | 154—2.77 |
| 2,970,974 | 2/1961 | Albus | 260—27 |
| 3,188,512 | 6/1955 | Moore | 313—110 |
| 3,267,204 | 8/1966 | Peters | 174—137 |

FOREIGN PATENTS 16,497  7/1896  Great Britain.

JOHN HUCKERT, Primary Examiner

A. J. JAMES, Assistant Examiner

U.S. Cl. X.R.

161—202; 313—331